(12) United States Patent
Evans et al.

(10) Patent No.: US 8,949,890 B2
(45) Date of Patent: Feb. 3, 2015

(54) SYSTEM AND METHOD FOR TARGETING ADVERTISEMENTS

(75) Inventors: Justin Evans, New York, NY (US);
Tyler Liebowitz, New York, NY (US)

(73) Assignee: Collective, Inc., New York, NY (US)

( * ) Notice: Subject to any disclaimer, the term of this patent is extended or adjusted under 35 U.S.C. 154(b) by 0 days.

(21) Appl. No.: 13/441,457

(22) Filed: Apr. 6, 2012

(65) Prior Publication Data

US 2012/0284746 A1 Nov. 8, 2012

Related U.S. Application Data

(60) Provisional application No. 61/481,772, filed on May 3, 2011.

(51) Int. Cl.
| | |
|---|---|
| H04N 7/10 | (2006.01) |
| H04N 7/025 | (2006.01) |
| H04N 21/81 | (2011.01) |
| G06Q 30/02 | (2012.01) |
| H04N 21/442 | (2011.01) |

(52) U.S. Cl.
CPC ............. H04N 21/812 (2013.01); G06Q 30/02 (2013.01); H04N 21/44204 (2013.01)
USPC .............. 725/35; 725/32; 725/34; 705/14.49; 705/14.53; 705/14.58; 705/14.73

(58) Field of Classification Search
USPC .......................................................... 725/35
See application file for complete search history.

(56) References Cited

U.S. PATENT DOCUMENTS

| | | | |
|---|---|---|---|
| 6,718,551 B1* | 4/2004 | Swix et al. ................... 725/32 |
| 2002/0178445 A1* | 11/2002 | Eldering et al. ............... 725/32 |
| 2003/0145323 A1* | 7/2003 | Hendricks et al. ............. 725/34 |
| 2007/0067297 A1 | 3/2007 | Kublickis | |
| 2007/0180469 A1* | 8/2007 | Finley et al. ................... 725/46 |
| 2007/0204292 A1* | 8/2007 | Riedl et al. .................... 725/34 |
| 2008/0259906 A1* | 10/2008 | Shkedi ......................... 370/352 |
| 2009/0049469 A1 | 2/2009 | Small et al. | |
| 2009/0172728 A1* | 7/2009 | Shkedi et al. .................. 725/34 |
| 2010/0058375 A1* | 3/2010 | LaFreniere et al. ............. 725/9 |
| 2010/0131363 A1 | 5/2010 | Sievert et al. | |
| 2010/0185517 A1 | 7/2010 | Higgins et al. | |
| 2010/0228629 A1 | 9/2010 | Harrison et al. | |
| 2011/0231246 A1 | 9/2011 | Bhatia et al. | |
| 2011/0231305 A1 | 9/2011 | Winters | |

OTHER PUBLICATIONS

International Search Report issued in counterpart PCT Application No. PCT/US12/32539 on Jul. 6, 2012.
International Search Report and Written Opinion issued in counterpart PCT/US2012/044571 on Sep. 11, 2012.

* cited by examiner

*Primary Examiner* — Robert Hance
(74) *Attorney, Agent, or Firm* — Morgan Lewis & Bockius LLP

(57) ABSTRACT

Methods and systems for performing targeted advertising are described. In particular, ads are targeted to users based on TV viewing behaviors. This is achieved by linking TV viewing behaviors to anonymous digital identifiers, such as online browser keys or cookies.

6 Claims, 5 Drawing Sheets

SYSTEM AND METHOD FOR TARGETING ADVERTISEMENTS

CROSS REFERENCE TO RELATED APPLICATIONS

This application claims priority to U.S. Provisional Patent Application No. 61/481,772, filed May 3, 2011, the entirety of which is incorporated herein by reference.

FIELD OF THE INVENTION

The systems and methods described herein relate to targeting advertising.

SUMMARY OF EMBODIMENTS OF THE INVENTION

The present invention is directed to systems, methods and computer-readable media in which targeted advertising is achieved. In particular, ads are targeted to users based on TV viewing behaviors by linking TV viewing behaviors to anonymous online identifiers, such as browser keys or cookies, that are used to match online users to advertising opportunities. In one embodiment, this linkage is achieved by, first, obtaining data about TV viewing behaviors (e.g., set-top-box data or other sources) and having it appended with consumer characteristics. Separately, browser cookies are linked to consumer characteristics, and the cookies are made accessible to online advertising companies for targeting.

Advertisers choose TV viewing behaviors that are relevant to their online targeting strategy. Records representing households, or segments of households, are scored based on the degree to which they exhibit the advertiser's targeted TV viewing behaviors. Consumer characteristics are linked with the resulting scores. The targeted records are linked to anonymous online identifiers, such as browser cookies, for example, using a scoring model. The scored records are chosen to be targeted with online advertising. The list of targeted segments or households may be transferred to an online advertising system for use.

While the embodiments described relate to implementations in the online context, the invention is not so limited. Indeed, the present invention is applicable more broadly in digital environments such mobile platforms or connected TVs.

DETAILED DESCRIPTION

Figure 1:
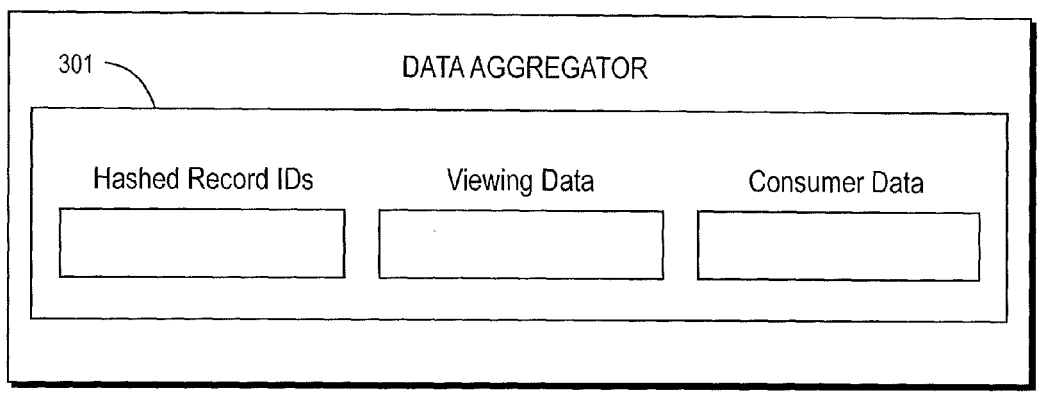
FIG. 1 illustrates data that is maintained by a Data Aggregator.

Television viewing data, and in particular set-top-box (STB) data, has been increasingly used by marketers and media companies to analyze consumer TV-viewing behaviors (programs and advertisements). Part of the valuable insight yielded by TV-viewing data, and STB data in particular, is the fact that it is ultimately sourced from customer records or self-reported sources and therefore can be anonymously linked to other consumer data. What is disclosed is a system and method for linking television viewing behaviors to online identifiers, such as browser cookies, using consumer data, for the purpose of targeting online advertising.

There are several reasons for targeting online advertising using TV viewing data. Such reasons include the fact that advertisers may reach online audiences based on what TV programs they watch; or advertisers may reach online audiences based on what TV advertisements they have been, or are likely to be, exposed to. It is generally accepted that performing a "one to one match" of the individual consumers contributing their viewing data to an aggregator of TV viewing data, with a targetable database (online or otherwise) is undesirable for privacy reasons. However, advertisers have a need to reach online audiences based on their TV viewing habits for several reasons, including, but not limited to: to extend the reach and frequency of their TV ad campaigns; to promote a TV program; to synchronize their online ads to their TV ads across screens; and to target viewers of their competitors' TV ads. A privacy-friendly means of offering this capability uses household, or geodemographic data, as a linking mechanism between TV viewing behavior and online cookies.

Described herein is a mechanism for making this linkage, which involves Data Aggregators, including set-top-box (STB) Data Aggregators, and Cookie Match Companies. TV viewing data comprises highly detailed viewing data about the TV viewing behaviors demonstrated on an individual television or all the televisions in a household. Data Aggregators include companies who aggregate anonymized TV viewing data cleanse it, arrange for the data to be appended with consumer characteristics, and make it available for analysis. Cookie Match Companies include companies who link anonymous browser cookies to consumer characteristics, and make the cookies accessible to online advertising companies for targeting.

The process for linking data reflecting television viewing behaviors to online browser cookies described herein includes the following steps, in one exemplary embodiment. TV viewing data, including digital set-top-box data, links personally identifiable information to television viewing behavior. Consumer characteristics are linked to the TV viewing behavior, and the personally identifiable information (PII) is eliminated. The TV-viewing data and consumer data are aggregated and made available for analysis. An advertiser chooses TV viewing behaviors that are relevant to their online targeting strategy. Records representing households, or segments of households, are scored based on the degree to which they exhibit the advertiser's targeted TV viewing behaviors. A model is created linking the consumer characteristics with the resulting scores. The scored records are chosen to be targeted with online advertising. The list of targeted segments or households may be transferred to an online advertising system for use. The list is used as "seed data" for a model that is able to expand the number of records used by the online advertising system for targeting.

With reference to FIG. 1, the Data Aggregator 300 maintains one or more databases 301 comprising a household-record-level database that includes (1) anonymous unique identifiers, (2) TV viewing data, and (3) consumer data. The consumer data includes characteristics that may include, but are not limited to, general geographic location, household characteristics such as household composition, age, gender, race, range of income, occupation, dwelling type, etc., as well as characteristics such as past purchasing behavior and other purchase and lifestyle characteristics such as media preferences or hobbies. The TV viewing data may be actual viewing data obtained from a STB Data Provider (e.g., an MSO, Telecom etc.). Alternatively, the TV viewing data may be self-reported (e.g., obtained by way of surveys or participation in a panel).

Proceeding with the process, the desired TV viewing behavior is identified, based on the needs of an advertiser. Advertisers choose whether they wish to target audiences based on their viewing of a TV program or a TV advertising campaign. The desired TV viewing behavior is encoded in the form of a viewing schedule ("Target Schedule"), an example of which is shown below in Table 1, identifying the desired time, date, and network of the programs as well as the desired level of the viewers' exposure to the programs and/or TV advertising.

TABLE 1

Target Schedule

| Date | Time | Network | Program | Units (Ad Frequency) |
|---|---|---|---|---|
| Mar. 1, 2012 | 8:00 PM | A | Show A | 2 |
| Mar. 1, 2012 | 8:00 PM | B | Show B | 1 |
| Mar. 1, 2012 | 8:00 PM | C | Show C | 1 |
| Mar. 1, 2012 | 9:00 PM | D | Show D | 1 |
| Mar. 8, 2012 | 9:00 PM | E | Show E | 2 |
| Mar. 8, 2012 | 9:00 PM | F | Show F | 1 |
| Mar. 8, 2012 | 9:00 PM | G | Show G | 2 |
| Mar. 15, 2012 | 8:00 PM | H | Show H | 2 |
| Mar. 15, 2012 | 8:00 PM | I | Show I | 1 |
| Mar. 15, 2012 | 9:00 PM | J | Show J | 1 |

A computer software program maintained by the Data Aggregator is then used to match the Target Schedule to the viewing data portion of the records in the Detailed TV Viewing Database. In one embodiment, the software program results in the generation of a score for each record in the Detailed TV Viewing Database ("Targeting Score") that reflects the degree to which TV viewers corresponding to the records in the Detailed TV Viewing Database exhibited the desired TV viewing behavior. The Targeting Score may be calculated based on the frequency with which the household was exposed to the programs or advertising in the past; or alternative methods (e.g., the amount of time the household spent with the program or ad). The Targeting Score may assume values that are (1) binary, e.g., "YES" or "NO" determining, for example, whether a record or group of records is part of an audience within the desired target for the advertiser; (2) categorical, such as "HIGH", "MEDIUM" and "LOW" levels of exposure to the Target Schedule, or counts of frequency of exposure to specific advertising; or (3) continuous, including more general measures of similarity between a TV viewer's schedule and the Target Schedule. The Targeting Scores are recorded in the database in such a way that they can be tracked back to the records that generated them.

A computer software program is used to process the consumer characteristics in the records within the Detailed TV Viewing Database, in conjunction with the corresponding Targeting Scores, in order to establish a relationship ("Scoring Model") such that, given a set of consumer and household characteristics for a household for which no TV viewing behavior is known, the desired TV viewing behavior score ("Predicted Score") for this latter household may be predicted. This software program may be maintained by the Data Aggregator, or by any party storing, and/or with access to, the Detailed TV Viewing Database. The Predicted Score may differ from the Targeting Score in format, range of values and meaning. For example, the Predicted Score may assume binary values indicating whether or not the household belongs to the targeted audience, while the Targeting Score used to create the Scoring Model can be categorical or continuous. This relationship can be a predictive model, a rule-based system, a classification method, or any other method, rule or function that maps a set of consumer and household characteristics to the Predicted Score. In particular, this may be accomplished using Audience Segmentation as well as Regression, described in the following.

In a regression scoring model, consumer characteristics are represented in a numerical form, as a matrix, where each row represents a record from the Detailed TV Viewing Database and each column represents a particular consumer characteristic for that record. This matrix is treated as a set of independent variables, while the set of corresponding Targeting Scores is treated as the dependent variable. A set of numerical coefficients is then generated by linear regression computer software and stored on a computer media. These coefficients, along with the definition of the consumer characteristics and their encoding in the numerical matrix, comprise a Scoring Model. An example is provided as follows.

$$y = A1(1.2) + A2(-0.9) + B1(5) + C1(0.6)$$

y="Watches TV Schedule"
A1=Income Characteristic A1
A2=Income Characteristic A2
B1=Geography Characteristic B1
C1=Presence of Kids Characteristic C1

Using a segmentation scoring model, the Detailed TV Viewing Database is arranged into groups of records, or segments, according to their characteristics ("Segmentation Scheme"). The characteristics should be chosen for their anticipated predictive value. Each segment is given a persistent identifier or number. Tables 2, 3 and 4 below provide an illustrative example.

TABLE 2

Creating the Segmentation Scheme
Consumer Characteristics

| Hashed Record IDs | Consumer Characteristic A (e.g. Income) | Consumer Characteristic B (e.g. Geography) | Consumer Characteristic C (e.g. Presence of Kids) |
|---|---|---|---|
| Record 1 | A1 (e.g. $50,000-$75,000) | B1 (eg Chicago DMA) | C1 (e.g. Kids = Yes) |
| Record 2 | A2 (e.g. $75,000-$100,000) | B2 (eg Detroit DMA) | C2 (e.g. Kids = No) |
| Record 3 | A3 (e.g. $100,000+) | B3 (eg Minneapolis DMA) | |

TABLE 3

Segmentation Scheme

| Segment | Characteristic A | Characteristic B | Characteristic C |
|---|---|---|---|
| 1 | A1 | B1 | C1 |
| 2 | A1 | B1 | C2 |

TABLE 4

Segmentation Scheme Application

| Segment | Records | Characteristic A | Characteristic B | Characteristic C |
|---|---|---|---|---|
| 1 | 1  | A1 | B1 | C1 |
| 1 | 11 | A1 | B1 | C1 |
| 1 | 21 | A1 | B1 | C1 |
| 2 | 2  | A1 | B1 | C2 |
| 2 | 12 | A1 | B1 | C2 |
| 2 | 22 | A1 | B1 | C2 |

For each segment, a computer program computes a Segment Targeting Score. The Segment Targeting Score may be, for example, an average of the Targeting Scores of the records from the Detailed TV Viewing Database that belong to the given segment. An illustrative example is shown in Table 5.

TABLE 5

Segment Scoring

| Segment | Reach | Frequency | Impressions | Average | Index | Targeting Score |
|---|---|---|---|---|---|---|
| 1  | 60% | 2 | 1.2 | 2.1 | 56  | 7  |
| 2  | 70% | 3 | 2.1 | 2.1 | 98  | 3  |
| 3  | 50% | 4 | 2.0 | 2.1 | 93  | 4  |
| 4  | 80% | 3 | 2.4 | 2.1 | 112 | 2  |
| 5  | 90% | 5 | 4.5 | 2.1 | 210 | 1  |
| 6  | 60% | 3 | 1.8 | 2.1 | 84  | 5  |
| 7  | 50% | 2 | 1.0 | 2.1 | 47  | 8  |
| 8  | 20% | 3 | 0.6 | 2.1 | 28  | 9  |
| 9  | 80% | 2 | 1.6 | 2.1 | 75  | 6  |
| 10 | 40% | 1 | 0.4 | 2.1 | 19  | 10 |

The computer software program, optionally with an application of discretion of a human operator, analyzes the Segment Targeting Scores and identifies segments that satisfy certain criteria, such as a minimum or a maximum value of the Segment Targeting Score, or any other suitable criteria, such that membership of a given consumer household in one or more of these segments is indicative of the desired TV viewing behavior. The selected segments and their definitions derived from the consumer characteristics thus comprise a Scoring Model. The Predicted Score in this case is expressed as a binary indicator determining whether or not a given consumer household belongs to the targeted audience.

Alternatively, the Predicted Score for a consumer household is another function of the Segment Targeting Score, including simply the Segment Targeting Score itself. In this case, the Scoring Model is comprised of the segment definition and the Segment Targeting Score for each segment.

Continuing with a description of the process, online data is collected by an online advertising company or a company that is otherwise an aggregator of online data ("Online Data Aggregator") and stored in a computer database. The online data records include (1) a user key, such as a browser cookie, that is sufficient to distinguish between different internet users but does not personally identify the user and (2) data related to internet browsing, such as the type of the browser, computer operating system, general geographic location of the internet connection, internet site visitation history, records of online and offline purchases of the advertiser's products, other consumer and household information not available to the Consumer Data Supplier involved in the TV Viewing data composition (e.g., search keywords etc.).

Figure 2:
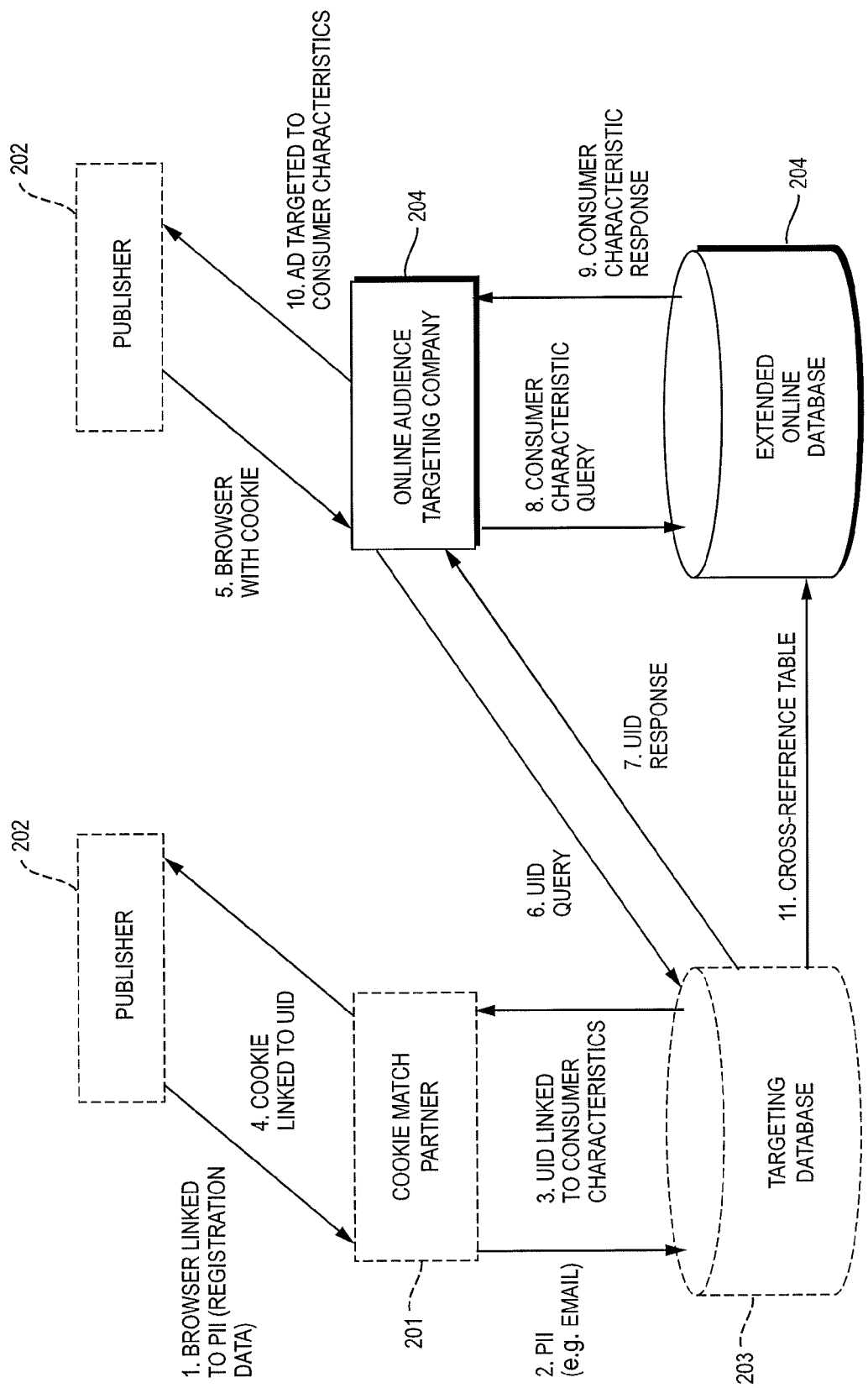
FIG. 2 illustrates an exemplary system for creating an extended online database, in accordance with one exemplary embodiment of the invention.

With reference to FIG. 2, the Online Data Aggregator creates an expanded online database with consumer and household characteristics appended to the online data records. This is typically done through a Cookie Match Partner 201. The Cookie Match Partner 201 leverages publisher partners 202 to match PII (such as an email address) to Consumer Characteristics. During a web session, the publisher 202 passes PII to the Cookie Match Partner 201, in step 1, who then links the PII to consumer characteristics in step 2; creates a unique, anonymous identifier linked to the characteristics in step 3; and destroys the PII. What remains is a database 203 that links a browser cookie to a universal identifier (UID), step 4, to consumer characteristics (such as "W18-24"). Then, when the Online Data Aggregator accesses a cookie when serving an ad into a publisher site in step 5, the Online Data Aggregator may query the Cookie Match Partner 201 to link the cookie to a UID in step 6. If the UID is unknown, the Cookie Match Partner may pass the UID to the Online Data Aggregator in step 7. If the UID is known, the Online Data Aggregator may lookup the UID in its own targeting database in step 8. The consumer characteristics linked to the UID are then accessed in step 9, and may be used to serve ads in step 10 by Online Audience Targeting Company 204. By this process, the same consumer and household characteristics are appended to this database as those included in the Detailed TV Viewing Database. The expanded online data records are stored in a computer database, Extended Online Database 204, in step 11, and are made available for further analysis.

As described previously, the Scoring Model, for the regression model, comprises the coefficients and definitions of the consumer characteristics and their encoding and, for the segmentation methodology, comprises the definitions of the segments and their Segment Targeting Scores). These items are stored on computer media (e.g., a disk or in memory) and are made available on the computer system that has access to the Extended Online Database. Optionally, the Scoring Model is transferred from the computer system that has access to the Detailed TV Viewing Database to a different computer system without any access to the TV Viewing data records but with the access to the Extended Online Database.

A computer software program processes the consumer and household characteristics in the records within the Extended Online Database and applies the Scoring Model to these records in order to produce the corresponding Predicted Score for each record. This software program may be maintained by the Online Data Aggregator, or any party storing, and/or with access to, the Extended Online Database. The user keys and the corresponding Predicted Scores are stored on a computer media or a database for further processing. For example, in the case of the Regression Scoring Model, the consumer characteristics in the records within the Extended Online Database are encoded in numerical form in the same manner as they were encoded in the Detailed TV Viewing Database; the numerical values are multiplied by the Regression Scoring Model coefficients and summed together to yield the Predicted Score for each record. In another example of the Segmentation Scoring Model, the records within the Extended Online Database are grouped according to the same rules or structure as the Segmentation Scheme used for the records in the Detailed TV Viewing Database, and are labeled with the same identifiers as the original Segmentation Scheme. The Predicted Score for each record is assigned based on the membership of each consumer household in a segment that is part of the Scoring Model.

A computer software program maintained by the Online Data Aggregator selects the Predicted Scores, and the corresponding user keys, that satisfy some predefined criteria. The criteria are set based on the needs of the advertiser. For example, such criteria could encompass selecting a given number, or a given fraction of user keys with the highest (or lowest) Predicted Scores. In another scenario, the selection would include user keys with the corresponding Predicted Score above (or below) a given threshold. Numerous other selection criteria are possible. The result of this process is a list of user keys, e.g., a list of cookies, that are associated with internet users who are likely to exhibit the desired TV viewing behavior ("Target List").

The Target List is transferred to a computer system, maintained by the Online Data Aggregator, typically an ad server, that performs online advertising. The user keys on the Target List are then used for reaching the audience desirable for the advertiser. For example, an ad server may keep a list of user keys suitable for a particular ad, and when the same user key is observed online in a browser session, the ad server selects and displays this ad in the user's web browser.

Optionally, the Target List is used as the seed list for Audience Extension. This is sometimes necessary due to the fact that the number of records included in the Extended Online Database may be limited by the availability of consumer characteristics associated with online cookies. As a result, in order to meet the needs of a large advertiser, more records must be identified which meet the criteria of the Target List. Audience Extension is a technique in which a multitude of internet users are assigned a score (Audience Extension Score) that reflects the likelihood of each particular user to exhibit a desired behavior, such as desired TV viewing behavior or purchasing behavior. This can be achieved by a variety of techniques, including constructing a predictive model where the dependent variable is the membership of the online user in a known or predicted audience that does exhibit the desired behavior, such as the users that match the Target List. The independent variables can be the same variables that were used for generating the Scoring Model, along with variables that were not available in the Detailed TV Viewing Database, but are available in an Extended Online Database. The Audience Extension Score is used to define a larger pool of internet users that are likely to exhibit the desired TV viewing behavior.

The following provides an illustrative example of the systems and processes described herein. A brand advertiser, Advertiser A, is launching a new product, Product X. In order to ensure that audiences are aware of the new product, Advertiser A wishes to show online ads to the same audiences that are seeing the Product X ads on TV. The Product X team has already established the network programs and/or dayparts where it will advertise on TV. This TV schedule is provided to the service provider. The service provider or a Data Aggregator performs an analysis and scores the segments (predefined in its targeting database) based on their likelihood to be exposed to the Product X TV schedule. This is based on the extent to which, in the past, these segments watched the programs Product X will advertise on. The Service Provider sets the criteria that any segment with an index of 150 or greater for watching Product X TV ads will be targeted with the Product X online ads. The segments indexing at 150 or higher are identified. They make up the top 20% of the segments scored. The records in the service provider's targeting database corresponding to the "in-target" segments make up 1 million records. The service provider estimates that Advertiser A will need 5 million records to fulfill the reach and frequency goals of the Product X campaign. The service provider creates an Audience Extension to increase the number of records in its targeting database with a high likelihood to see Product X TV ads. The service provider identifies all the cookies in its database likely to be exposed to Product X TV ads, and sets them as the cookies to be targeted in its ad-serving system. The online campaign begins at the same time as the Product X TV campaign, and households are exposed to both ads.

Figure 3A:
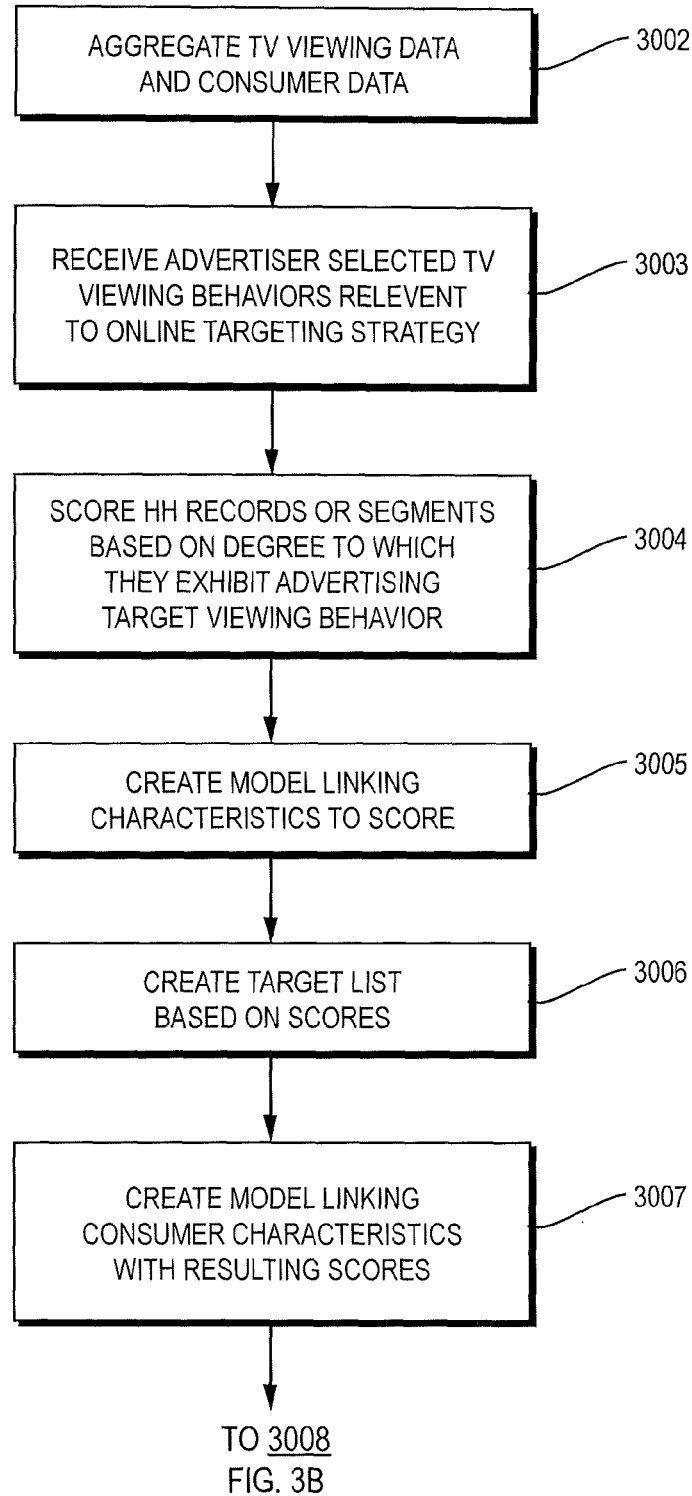
FIGS. 3A and 3B illustrate an exemplary method for performing targeted advertising in accordance with the systems and methods described herein.
Figure 3B:
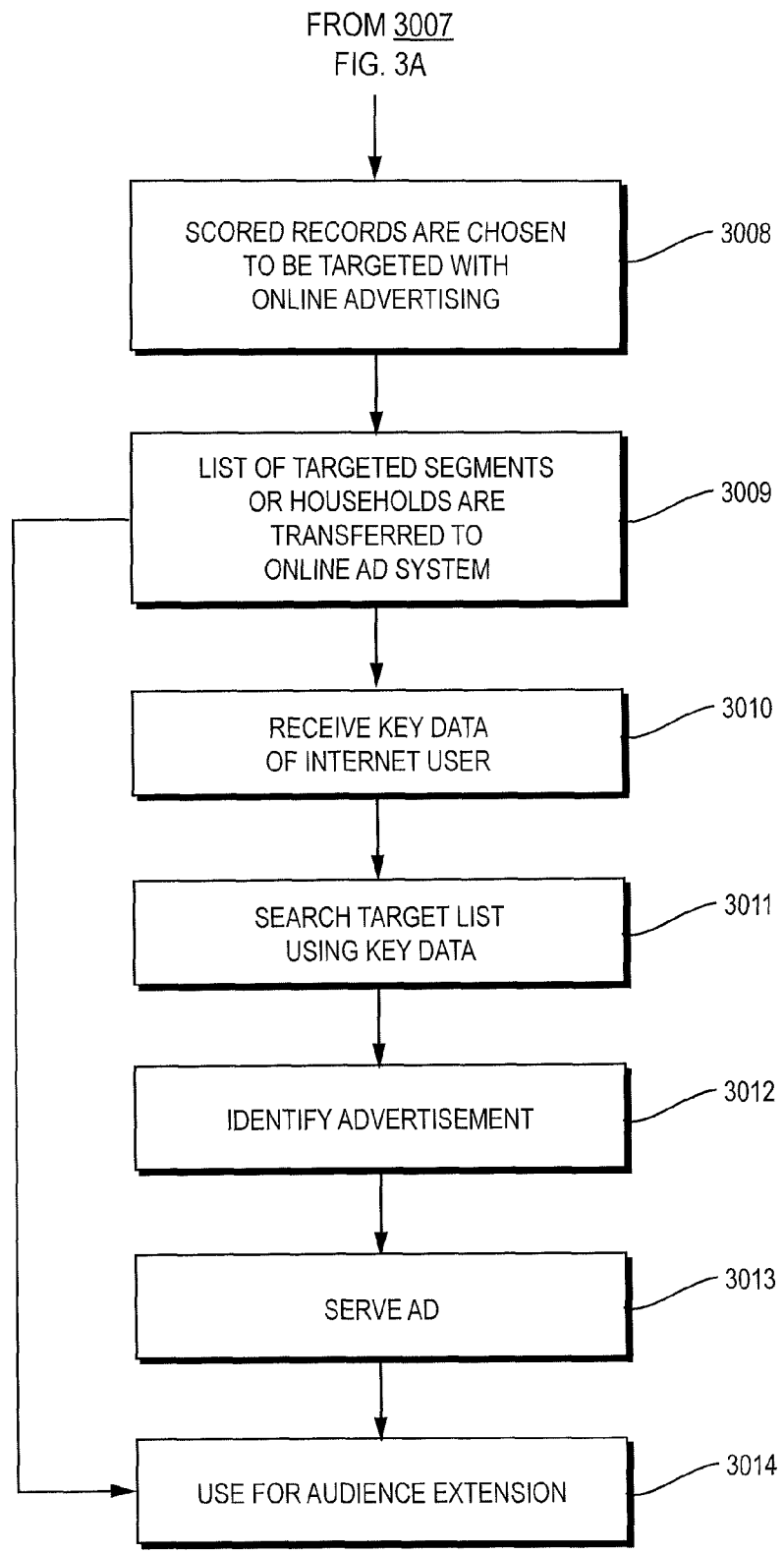

FIGS. 3A and 3B illustrate an exemplary method that may be used to implement certain embodiments of the present invention. In step 3002, TV viewing data and consumer data are aggregated. In step 3003, advertiser-selected TV viewing behaviors relevant to online targeting strategy are received. In step 3004, household records or segments are scored based on the degree to which they exhibit advertising target viewing behavior. In step 3005, a model linking characteristics to a score is created. In step 3006, a target list based on the scores is created. In step 3007, a model linking consumer characteristics with resulting scores is created. In step 3008, scored records are chosen to be targeted with online advertising. In step 3009, the list of targeted segments is transferred to an online advertising system. This list of targeted segments can be used for audience extension, in step 3014, or for serving advertisements, as described in steps 3010 to 3013. In step 3010, key data of an internet user is received. In step 3011, a target list is searched using the key data. In step 3012, an advertisement is identified based on the search and, in step 3013, the advertisement is served to the internet user.

Figure 4:
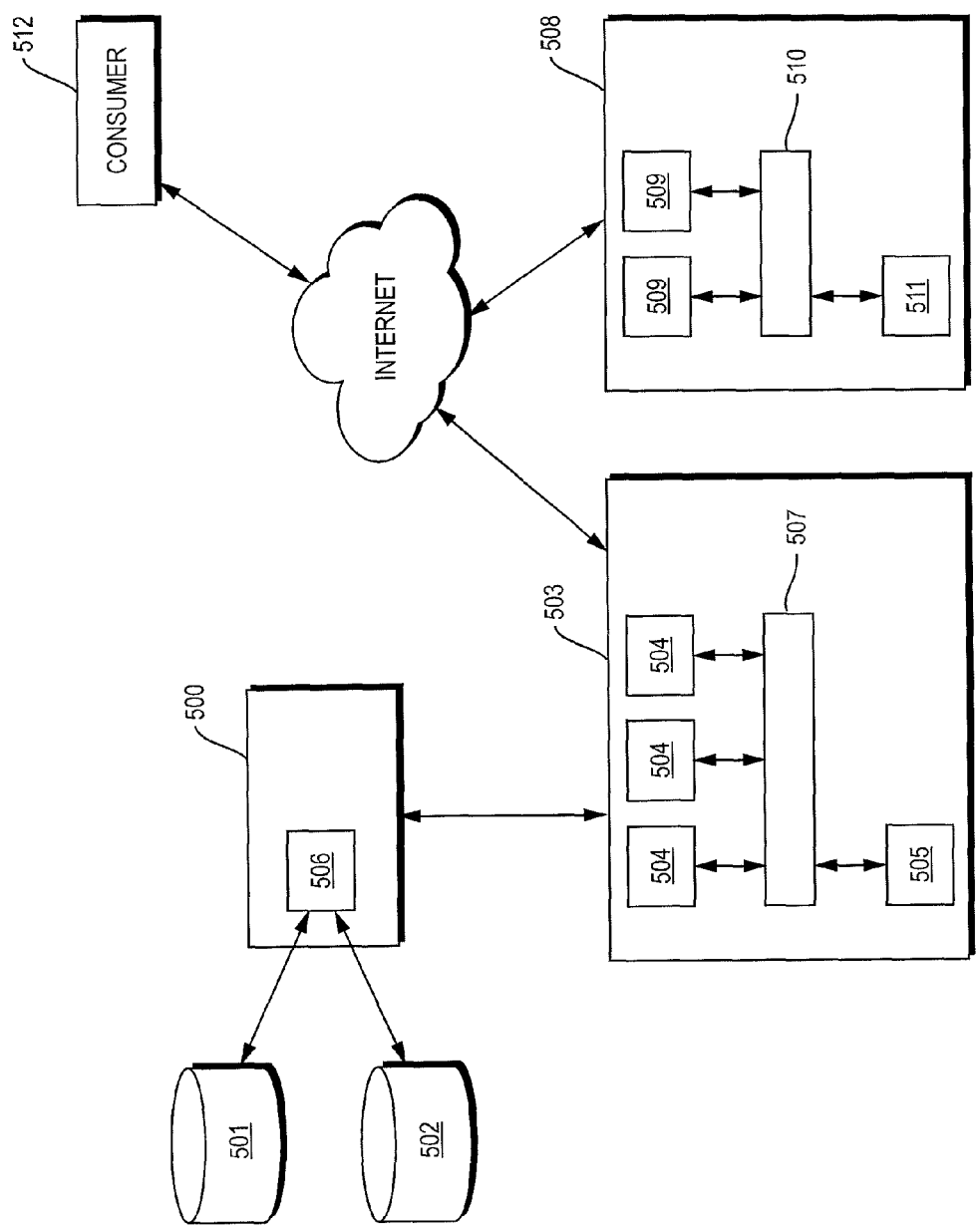
FIG. 4 illustrates exemplary computer hardware and software systems that may be used in connection with the present invention.

Exemplary hardware and software employed by the systems are now generally described with reference to FIG. 4. Database server(s) 500 may include a database services management application 506 that manages storage and retrieval of data from the database(s) 501, 502. The databases may be relational databases; however, other data organizational structure may be used without departing from the scope of the present invention. One or more application server(s) 503 are in communication with the database server 500. The application server 503 communicates requests for data to the database server 500. The database server 500 retrieves the requested data. The application server 503 may also send data to the database server for storage in the database(s) 501, 502. The application server 503 comprises one or more processors 504, computer readable storage media 505 that store programs (computer readable instructions) for execution by the processor(s), and an interface 507 between the processor(s) 504 and computer readable storage media 505. The application server may store the computer software programs referred to herein.

To the extent data and information is communicated over the web, one or more web servers 508 may be employed. The web server 508 also comprises one or more processors 509, computer readable storage media 511 that store programs (computer readable instructions) for execution by the processor(s) 509, and an interface 510 between the processor(s) 509 and computer readable storage media 511. The web server 508 is employed to deliver content that can be accessed through the communications network, e.g., by consumer 512. When data is requested through an application, such as a web browser, the web server 508 receives and processes the request. The web server 508 sends the data or application requested along with user interface instructions for displaying a user interface.

The computers referenced herein are specially programmed to perform the functionality described herein as performed by the software programs.

The computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

What is claimed is:

1. A system comprising:
memory operable to store at least one program; and
at least one processor communicatively coupled to the memory, in which the at least one program, when executed by the at least one processor, causes the at least one processor to:
receive anonymous identifier data associated with a digital media user, wherein the anonymous identifier data comprises data relating to internet browsing;
search a database comprising target list data based on the anonymous identifier data;
wherein the target list data comprises a list of anonymous identifiers that are associated with digital media users each of which is linked to a television-watching household and corresponding household-level television viewing behavior, the household-level television viewing behavior comprising data describing television viewing activity of a household that has concluded before the receiving of the anonymous identifier, wherein the linking comprises associating the digital media user with television viewing behavior indicated by an advertiser, wherein the linking is performed based on a comparison of (1) one or both of demographic information and geographic characteristics associated with the digital media user to (2) one or both of demographic characteristics and geographic characteristics associated with the television-watching household; and
receive a result of the search comprising data describing television viewing behavior associated with the digital media user.

2. The system of claim 1, wherein the processor is further caused to:
identify an advertisement of the advertiser to serve to the user based on the search of the database.

3. A non-transitory computer-readable storage medium that stores instructions which, when executed by one or more processors, cause the one or more processors to perform a method comprising:
receiving anonymous identifier data associated with a digital media user, wherein the anonymous identifier data comprises data relating to internet browsing;
searching a database comprising target list data based on the anonymous identifier data;
wherein the target list data comprises a list of anonymous identifiers that are associated with digital media users each of which is linked to a television-watching household and corresponding household-level television viewing behavior, the household-level television viewing behavior comprising data describing television viewing activity of a household that has concluded before the receiving of the anonymous identifier, wherein the linking comprises associating the digital media user with the household-level viewing a behavior indicated by an advertiser, wherein the linking is performed based on a comparison of (1) one or both of demographic information and geographic characteristics associated with the digital media user to (2) one or both of demographic characteristics and geographic characteristics associated with the television-watching household; and
receiving a result of the search comprising data describing television viewing behavior associated with the digital media user.

4. The non-transitory computer-readable storage medium of claim 3 wherein the method further comprises:
identifying an advertisement of the advertiser to serve to the digital media user based on the search of the database.

5. A computer-implemented method, comprising:
receiving user anonymous identifier data associated with a digital media user, wherein the anonymous identifier data comprises data relating to internet browsing;
searching a database comprising target list data based on the anonymous identifier data;
wherein the target list data comprises a list of anonymous identifiers that are associated with digital media users each of which is linked to a television-watching household and corresponding household-level television viewing behavior, the household-level television viewing behavior comprising data describing television viewing activity of a household that has concluded before the receiving of the anonymous identifier, wherein the linking comprises associating the digital media user with the household-level television viewing behavior indicated by an advertiser, wherein the linking is performed based on a comparison of (1) one or both of demographic information and geographic characteristics associated with the digital media user to (2) one or both of demographic characteristics and geographic characteristics associated with the television-watching household; and
receiving a result of the search comprising data describing television viewing behavior associated with the digital media user.

6. The computer-implemented method of claim 5 further comprising:
identifying an advertisement of the advertiser to serve to the digital media user based on the result of the search of the database.

* * * * *